United States Patent
Shivalinga et al.

(10) Patent No.: US 11,072,425 B2
(45) Date of Patent: Jul. 27, 2021

(54) SYNCHRONOUS LOCKING PIN ASSEMBLY

(71) Applicant: GOODRICH CORPORATION, Charlotte, NC (US)

(72) Inventors: Vinodkumar Shivalinga, Bangalore (IN); Venkatesh Chitragar, Bangalore (IN)

(73) Assignee: GOODRICH CORPORATION, Charlotte, NC (US)

( * ) Notice: Subject to any disclaimer, the term of this patent is extended or adjusted under 35 U.S.C. 154(b) by 227 days.

(21) Appl. No.: 16/221,974

(22) Filed: Dec. 17, 2018

(65) Prior Publication Data
US 2019/0382117 A1    Dec. 19, 2019

(30) Foreign Application Priority Data

Jun. 14, 2018 (IN) .............................. 201811022356

(51) Int. Cl.
*B64D 9/00* (2006.01)
*F16B 21/02* (2006.01)
*F16B 19/02* (2006.01)

(52) U.S. Cl.
CPC .............. *B64D 9/003* (2013.01); *F16B 21/02* (2013.01); *F16B 19/02* (2013.01)

(58) Field of Classification Search
CPC .......................... B64D 9/003; B64D 11/00152
USPC .............. 410/69, 77, 79, 80, 78, 92, 91, 97; 403/348, 120, 224, 254, 287, 353, 210
See application file for complete search history.

(56) References Cited

U.S. PATENT DOCUMENTS

| | | | |
|---|---|---|---|
| 3,377,040 A | 4/1968 | Hans En | |
| 3,800,713 A | 4/1974 | Nordstrom | |
| 3,810,534 A | 5/1974 | Prete, Jr. | |
| 4,077,590 A | 3/1978 | Shorey | |
| 4,234,278 A * | 11/1980 | Harshman ................. | B60P 7/13 244/118.1 |
| 5,356,250 A * | 10/1994 | Vogg ..................... | B64D 9/003 244/118.1 |
| 7,731,460 B2 | 6/2010 | Brown et al. | |
| 9,939,100 B2 | 4/2018 | Jiang et al. | |
| 10,118,700 B2 * | 11/2018 | Kuppan .................. | F03G 7/065 |
| 2015/0113839 A1 | 4/2015 | Bilal | |

FOREIGN PATENT DOCUMENTS

FR       2907757 A1    5/2008

OTHER PUBLICATIONS

European Search Report for Application No. 19179704.2, dated Nov. 12, 2019, 8 pages.

* cited by examiner

*Primary Examiner* — D Glenn Dayoan
*Assistant Examiner* — Sunsurraye Westbrook
(74) *Attorney, Agent, or Firm* — Cantor Colburn LLP

(57) ABSTRACT

A locking pin assembly for a cargo loading system includes a shaft, a first retention pin, a second retention pin, and a synchronizer. The shaft defines a first shaft groove and a second shaft groove. The first retention pin and the second retention pin are disposed within the shaft. The synchronizer is disposed about the shaft and defines a first synchronizer groove that crosses over the first shaft groove and a second synchronizer groove that crosses over the second shaft groove.

20 Claims, 4 Drawing Sheets

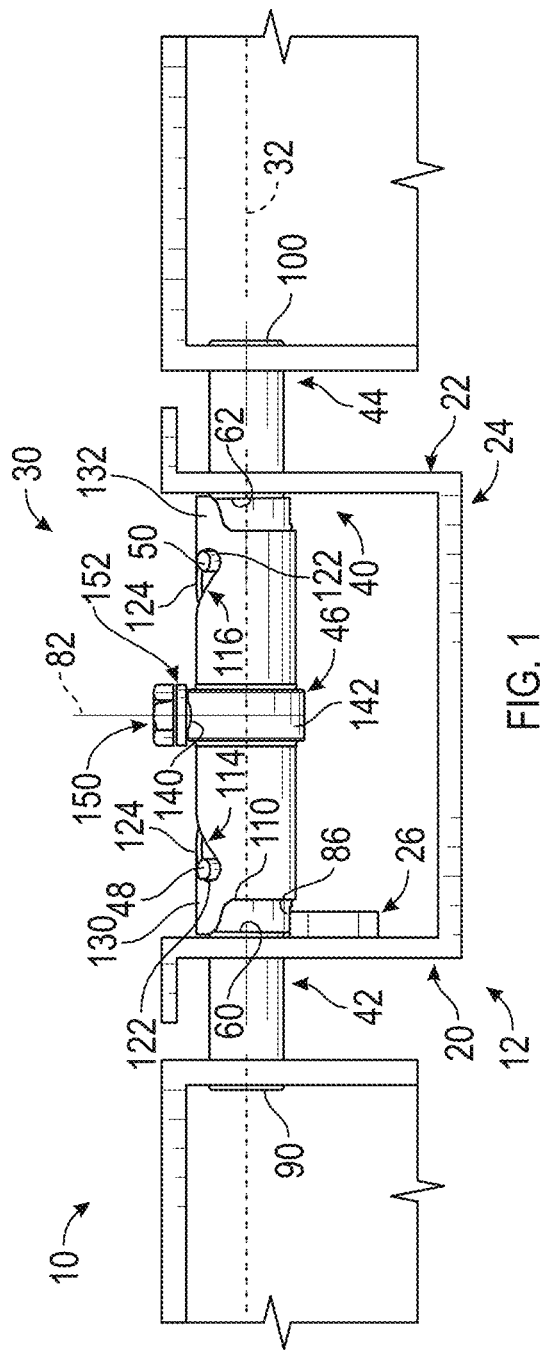

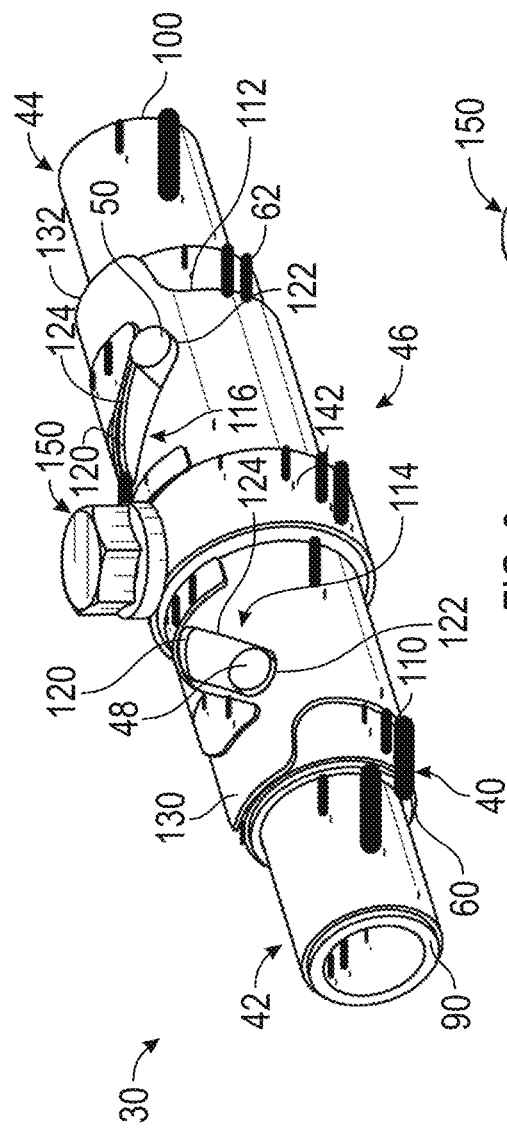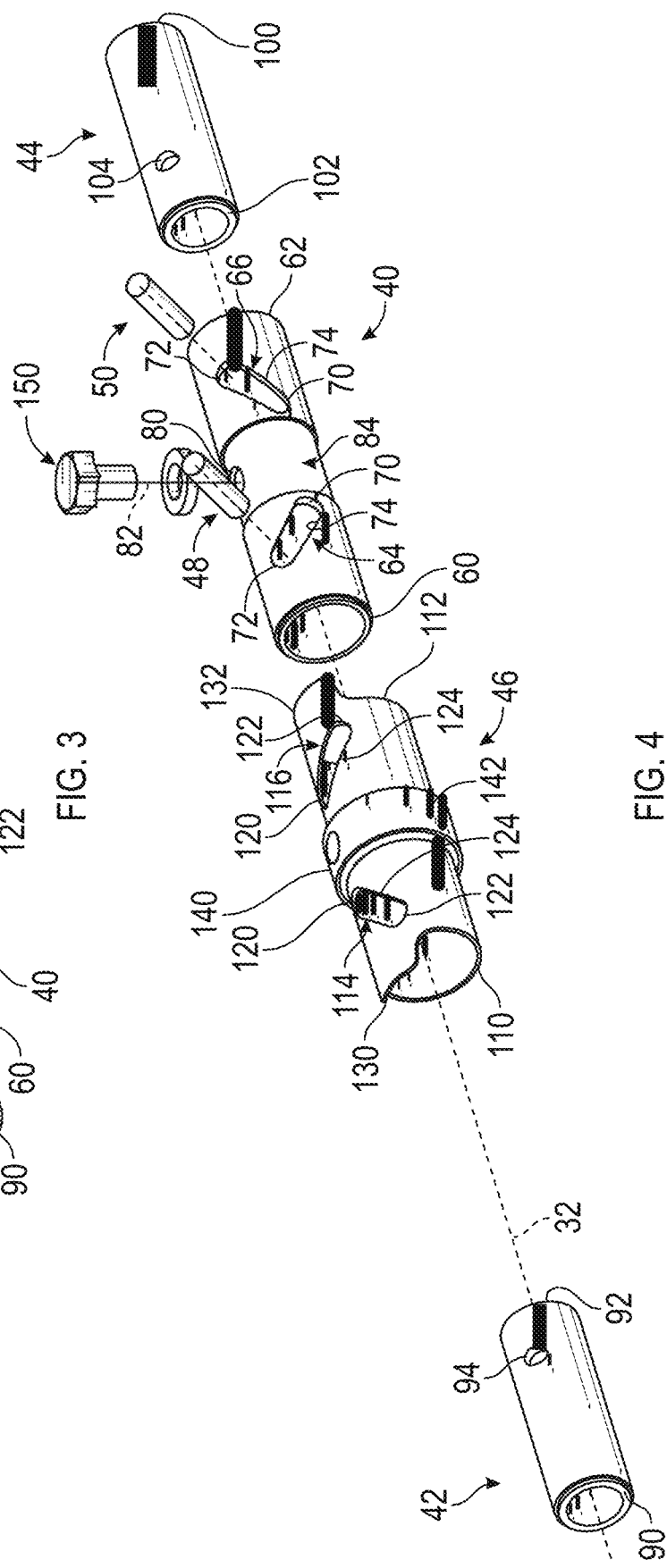

SYNCHRONOUS LOCKING PIN ASSEMBLY

FOREIGN PRIORITY

This patent application claims priority to Indian Provisional Patent Application Serial No. 201811022356, filed Jun. 14, 2018, which is incorporated herein by reference in its entirety.

BACKGROUND

Exemplary embodiments pertain to the art of cargo loading systems.

Aircraft include a cargo hold having a cargo loading system that facilitate the loading and unloading of cargo. Various configurations of the features may be provided based on a customer request. Changing between the various configurations may be time consuming and expensive due to the complexity of the existing cargo loading systems.

BRIEF DESCRIPTION

Disclosed is a cargo loading system that includes a structural support member and locking pin assembly. The structural support member has a first sidewall, a second sidewall disposed opposite the first sidewall, and a floor extending between the first sidewall and the second sidewall. The locking pin assembly is arranged to secure a line replaceable unit to the structural support member. The locking pin assembly includes a shaft, a first retention pin, a second retention pin, and a synchronizer. The shaft extends between a first shaft end and a second shaft end along a first axis. The first retention pin is disposed within the shaft and extends at least partially through the first shaft end. The second retention pin is disposed within the shaft and extends at least partially through the second shaft end. The synchronizer is disposed about the shaft. The synchronizer extends between a first synchronizer end and a second synchronizer end along the first axis. Responsive to rotation of the synchronizer about the first axis, the first retention pin moves relative to the first shaft end and the first sidewall along the first axis.

Also disclosed is a locking pin assembly for a cargo loading system. The locking pin assembly includes a shaft, a first retention pin, a second retention pin, and a synchronizer. The shaft extends between a first shaft end and a second shaft end along a first axis. The shaft defines a first shaft groove disposed proximate the first shaft end and a second shaft groove disposed proximate the second shaft end. The first retention pin and the second retention pin are disposed within the shaft. The synchronizer is disposed about the shaft. The synchronizer extends between a first synchronizer end and a second synchronizer end along the first axis. The synchronizer defines a first synchronizer groove that crosses over the first shaft groove and a second synchronizer groove that crosses over the second shaft groove.

BRIEF DESCRIPTION OF THE DRAWINGS

The following descriptions should not be considered limiting in any way. With reference to the accompanying drawings, like elements are numbered alike:

FIG. 1 is an end view of a portion of a cargo loading system having a locking pin assembly in a locked position;

FIG. 2 is an end view of the portion of the cargo loading system having the locking pin assembly in an unlocked position;

FIG. 3 is a perspective view of the locking pin assembly;

FIG. 4 is a disassembled view of the locking pin assembly;

DETAILED DESCRIPTION

A detailed description of one or more embodiments of the disclosed apparatus and method are presented herein by way of exemplification and not limitation with reference to the Figures.

Figure 5:
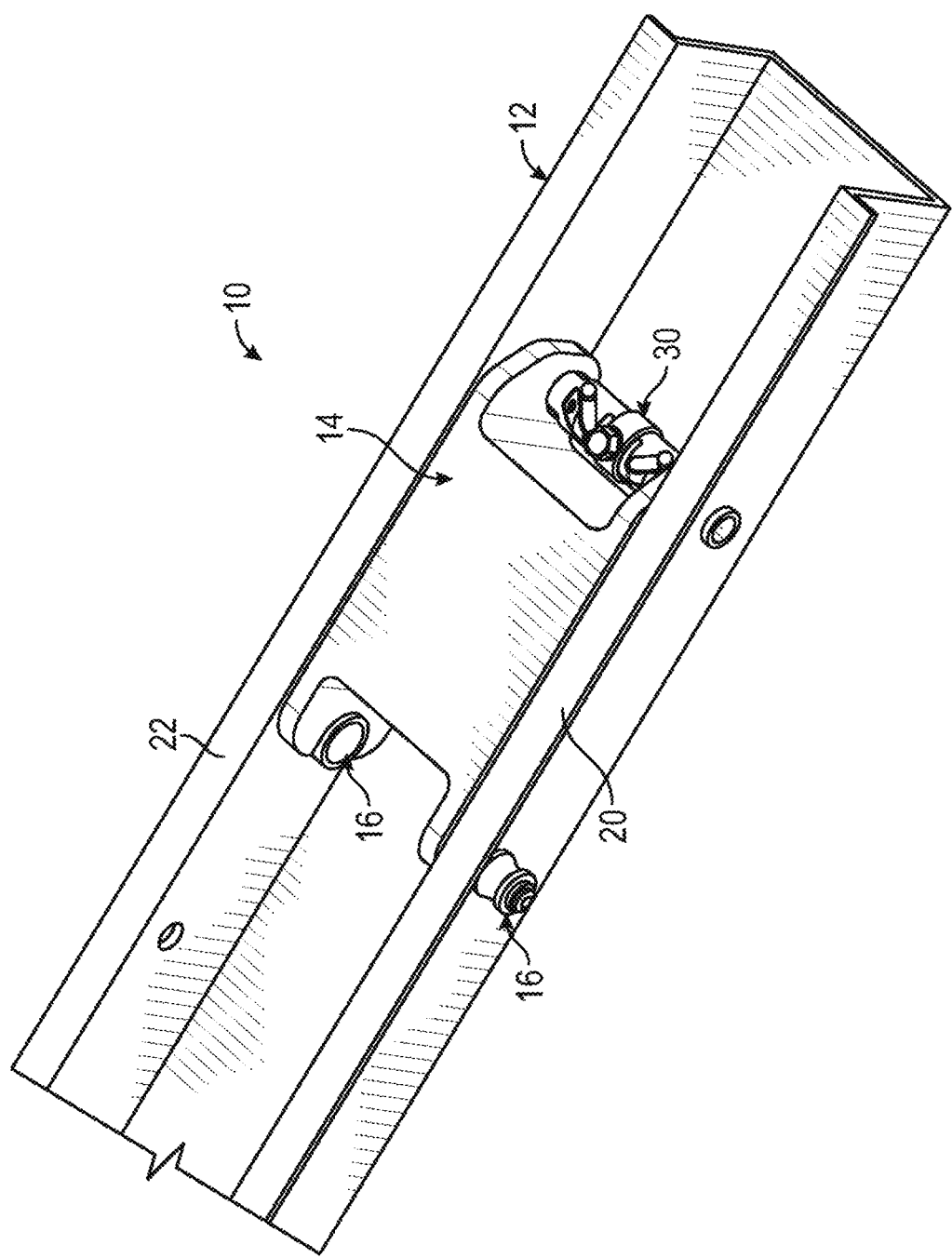
FIG. 5 is a perspective view of a line replaceable unit installed in a structural support member.
Figure 6:
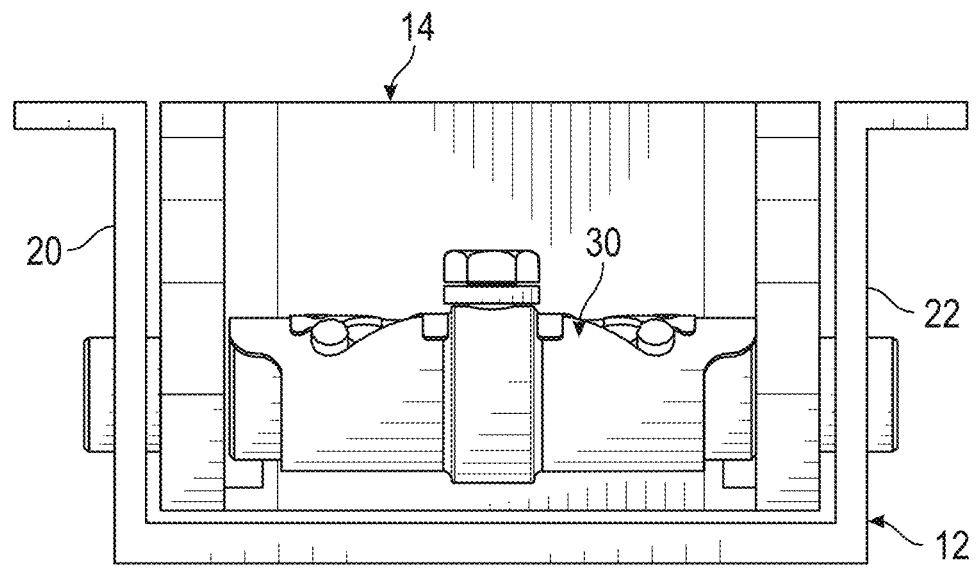
FIG. 6 is an end view of the line replaceable unit installed in the structural support member while the locking pin assembly is in the locked position.
Figure 7:
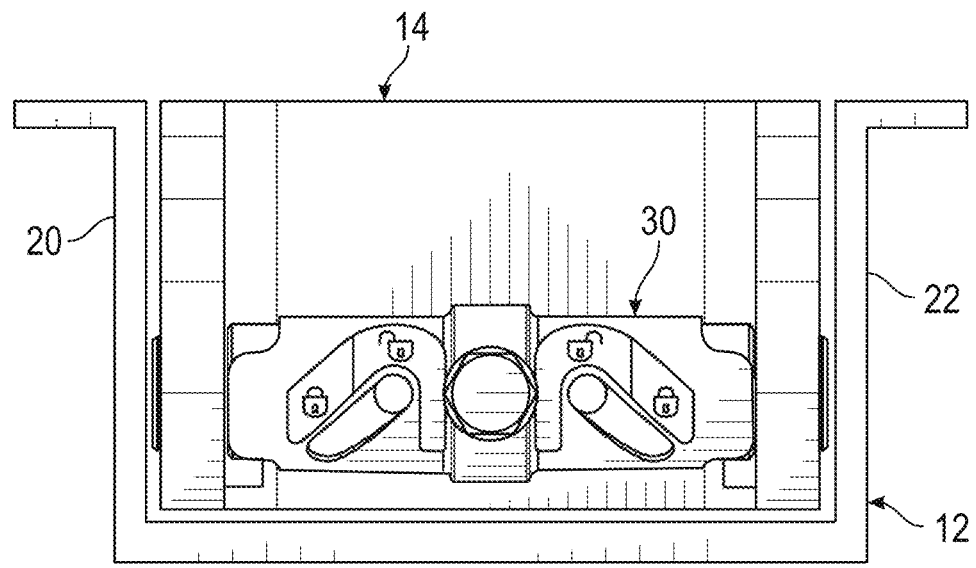
FIG. 7 is an end view of the line replaceable unit while the locking pin assembly is in the unlocked position.

Referring to FIGS. 1, 2, 5, 6, and 7, a cargo loading system 10 may be provided with an aircraft or other vehicle. The cargo loading system 10 may include components such as restraints, latches, or guides that are considered line replaceable units 14, as shown in FIGS. 5-7. These line replaceable units 14 are mounted on or in a structural support member 12 by a fastening assembly 16 that extends through a portion of the line replaceable unit 14 and into the structural support member and by a locking pin assembly that extends through another portion of the line replaceable unit 14 and into the structural support member. The fastening assembly 16 may include a bolt, a bushing, and a nut. The structural support member 12 may be referred to as a tray or a ball panel having a first sidewall 20, a second sidewall 22 disposed opposite the first sidewall 20, and a floor 24 extending between the first sidewall 20 and the second sidewall 22.

The first sidewall 20 of the structural support member 12 may include an anti-rotation feature 26. The anti-rotation feature 26 extends away from the first sidewall 20 towards the second sidewall 22. The anti-rotation feature 26 may be spaced apart from the floor 24. The anti-rotation feature 26 may be a protrusion, a tab, a weld nut, or the like, that extends towards and engages a flat or a portion of a locking pin assembly to inhibit rotation of at least a portion of a locking pin assembly about an axis.

The line replaceable units 14 may be removed from the first or second sidewall 20, 22 of the structural support member 12 and replaced/reinstalled with the structural support member 12 within a specified amount of time. The line replaceable units 14 may require the use of specialized tools to remove and replace individual line replaceable units 14. An operator may manually lock and unlock the individual line replaceable units 14 from the structural support member 12, which may involve a time-consuming process and errors may result in failures of the line replaceable units 14. Accordingly, it is desirable to provide a locking pin assembly 30 that may ease installation and removal of the line replaceable units 14 as well as mitigate errors that may result in failures or incorrect installation of the line replaceable units 14.

The locking pin assembly 30 is arranged to selectively secure a line replaceable unit 14 to the structural support member 12. The locking pin assembly 30 extends along a first axis 32. The locking pin assembly 30 is movable between a locked position, as shown in FIGS. 1, 5, and 6, and an unlocked position, as shown in FIGS. 2 and 7, by rotating at least a portion of the locking pin assembly 30 about the first axis 32.

Referring to FIGS. 1-7, the locking pin assembly 30 includes a shaft 40, a first retention pin 42, a second retention pin 44, a synchronizer 46, a first guide pin 48, and a second guide pin 50.

The shaft 40 extends between a first shaft end 60 and a second shaft end 62 along the first axis 32. Referring to FIG. 4, the shaft 40 defines a first shaft groove 64 that is disposed proximate the first shaft end 60 and a second shaft groove 66 that is disposed proximate the second shaft end 62.

The first shaft groove 64 may be spaced apart from the second shaft groove 66. The first shaft groove 64 and the second shaft groove 66 are arranged as guide grooves or guide openings that extend from an exterior surface of the shaft 40 towards the first axis 32. The first shaft groove 64 and the second shaft groove 66 are disposed in a non-parallel and non-perpendicular relationship with respect to the first axis 32 and each other. The first shaft groove 64 and the second shaft groove 66 include a first groove end 70, a second groove end 72, and groove walls 74 that extend between the first groove end 70 and the second groove end 72.

The shaft 40 defines a shaft opening 80 that extends from an exterior surface of the shaft 40 towards the first axis 32 along a second axis 82. The shaft opening 80 is disposed between the first shaft groove 64 and the second shaft groove 66.

The shaft 40 defines a recessed region 84. The recessed region 84 circumferentially extends about the exterior surface of the shaft 40 and radially extends from the exterior surface of the shaft 40 towards the first axis 32. The recessed region 84 is axially disposed between the first groove ends 70 of the first shaft groove 64 and the second shaft groove 66.

The shaft 40 defines a complementary anti-rotation feature or a flat 86 that is disposed proximate the first shaft end 60, as shown in FIGS. 1 and 5. The flat 86 of the shaft 40 is arranged to engage the anti-rotation feature 26 to inhibit rotation of the shaft 40 about the first axis 32.

Referring to FIGS. 1-7, the first retention pin 42 is slidably and rotatably received within the shaft 40. The first retention pin 42 extends at least partially through the first shaft end 60. The first retention pin 42 is arranged to move along the first axis 32 relative to the first shaft end 60 or the first sidewall 20, in response to rotation of the synchronizer 46 about the first axis 32 to move the locking pin assembly 30 between the locked position and the unlocked position.

Referring to FIG. 4, the first retention pin 42 extends between a first retention pin first end 90 and a first retention pin second end 92 along the first axis 32. The first retention pin second end 92 extends into the shaft 40. The first retention pin 42 defines a first pin opening 94 that is disposed proximate the first retention pin second end 92. The first pin opening 94 is proximately aligned with the first shaft groove 64.

Referring to FIGS. 1-7, the second retention pin 44 is slidably and rotatably received within the shaft 40. The second retention pin 44 extends at least partially through the second shaft end 62. The second retention pin 44 is arranged to move along the first axis 32 relative to the second shaft end 62 or the second sidewall 22, in response to rotation of the synchronizer 46 about the first axis 32 to move the locking pin assembly 30 between the locked position and the unlocked position.

Referring to FIG. 4, the second retention pin 44 extends between a second retention pin first end 100 and a second retention pin second end 102 along the first axis 32. The second retention pin second end 102 extends into the shaft 40. The second retention pin 44 defines a second pin opening 104 that is disposed proximate the second retention pin second end 102. The second pin opening 104 is proximately aligned with the second shaft groove 66.

The synchronizer 46 is disposed about the shaft 40, the first retention pin 42, and the second retention pin 44. The synchronizer 46 is rotatable about the first axis 32 relative to the shaft 40. The synchronizer 46 is rotatable between a first position that corresponds to the locked position of the locking pin assembly 30 and a second position that corresponds to the unlocked position of the locking pin assembly 30.

Referring to FIGS. 1-7, the synchronizer 46 extends between a first synchronizer end 110 and a second synchronizer end 112 along the first axis 32. The synchronizer 46 defines a first synchronizer groove 114 that is disposed proximate the first synchronizer end 110 and a second synchronizer groove 116 that is disposed proximate the second synchronizer end 112. The first synchronizer groove 114 is partially aligned with or crosses over the first shaft groove 64. The second synchronizer groove 116 is partially aligned or crosses over with the second shaft groove 66.

The first synchronizer groove 114 may be spaced apart from the second synchronizer groove 116. The first synchronizer groove 114 and the second synchronizer groove 116 are arranged as guide openings that extend from an exterior surface of the synchronizer 46 towards the shaft 40 and the first axis 32. The first synchronizer groove 114 and the second synchronizer groove 116 are disposed in a non-parallel and non-perpendicular relationship with respect to the first axis 32, with respect to the each and with respect to the first shaft groove 64 and the second shaft groove 66.

The first synchronizer groove 114 is angled in an opposite direction as the first shaft groove 64 and the second synchronizer groove 116 is angled in an opposite direction as the second shaft groove 66. The first synchronizer groove 114 and the second synchronizer groove 116 include a first synchronizer groove end 120, a second synchronizer groove end 122, and synchronizer groove walls 124 that extend between the first synchronizer groove end 120 and the second synchronizer groove end 122.

The synchronizer 46 includes a first tab or first extension 130 that extends from the first synchronizer end 110. The first extension 130 enables at least a portion of the first shaft end 60 to be exposed. The synchronizer 46 includes a second tab or a second extension 132 that extends from the second synchronizer end 112. The second extension 132 enables at least a portion of the second shaft end 62 to be exposed.

The synchronizer 46 defines a synchronizer opening 140 that extends from an exterior surface of the synchronizer 46 towards the first axis 32 along the second axis 82. The synchronizer opening 140 is disposed between the first synchronizer groove 114 and the second synchronizer groove 116. The synchronizer opening 140 is proximately aligned with the shaft opening 80 along the second axis 82 while the synchronizer 46 is in the first position and the locking pin assembly 30 is in the locked position. The synchronizer opening 140 is not aligned with or is circumferentially offset from the shaft opening 80 while the synchronizer 46 is in the second position and the locking pin assembly 30 is in the unlocked position.

The synchronizer 46 includes a raised portion 142 that circumferentially extends about the synchronizer 46. The raised portion 142 is axially disposed between the first synchronizer groove end 120 of the first synchronizer groove 114 and the second synchronizer groove 116. The raised portion 142 radially extends away from the first axis 32. In at least one embodiment, the synchronizer opening 140 extends through the raised portion 142 along the second axis 82.

A fastener 150 extends through the shaft opening 80 and into the synchronizer opening 140 maintain or lock the locking pin assembly 30 in the locked position, as shown in FIGS. 1 and 3. The fastener 150 may be a self-locking screw. A washer 152 may be provided along with the fastener 150 that is disposed between a head of the fastener 150 and the synchronizer 46. The fastener 150 may extend at least partially through the shaft opening 80 and is inhibited from extending into the synchronizer opening 140 and may extend into the recessed region 84 of the shaft 40, to inhibit the locking pin assembly 30 from being in the unlocked position. Upon rotation of the synchronizer 46 from the second position towards the first position, the fastener 150 is enabled to extend through the shaft opening 80 and into the synchronizer opening 140 to lock the locking pin assembly 30 in the locked position.

The first guide pin 48 extends through the first shaft groove 64 of the shaft 40, the first synchronizer groove 114 of the synchronizer 46, and extends into the first pin opening 94 of the first retention pin 42. The first guide pin 48 may be disposed proximate the second synchronizer groove end 122 of the first synchronizer groove 114, while the locking pin assembly 30 is in the locked position, as shown in FIGS. 1 and 3. The first guide pin 48 may be disposed proximate the first synchronizer groove end 120 of the first synchronizer groove 114, while the locking pin assembly 30 is in the unlocked position, as shown in FIG. 2.

The second guide pin 50 extends through the second shaft groove 66 of the shaft 40, the second synchronizer groove 116 of the synchronizer 46, and extends into the second pin opening 104 of the second retention pin 44. The second guide pin 50 may be disposed proximate the second synchronizer groove end 122 of the second synchronizer groove 116, while the locking pin assembly 30 is in the locked position, as shown in FIGS. 1 and 3. The second guide pin 50 may be disposed proximate the first synchronizer groove end 120 of the second synchronizer groove 116, while the locking pin assembly 30 is in the unlocked position, as shown in FIG. 2.

Responsive to rotation of the synchronizer 46 about the first axis 32, the locking pin assembly 30 moves between the unlocked position and the locked position and at least one of the first retention pin 42 moves relative to the first shaft end 60 and/or the first sidewall 20 and the second retention pin 44 moves relative to the second shaft end 62 and/or the second sidewall 22.

The grooves of the shaft 40 (e.g. the first shaft groove 64 and the second shaft groove 66) and the grooves of the synchronizer 46 (e.g. the first synchronizer groove 114 and the second synchronizer groove 116) are arranged as guide grooves that cross over each other such that the guide pins (e.g. the first guide pin 48 and the second guide pin 50) are forced inwards or outwards responsive to rotation of the synchronizer 46. The crossing over of the guide grooves in response to rotation of the synchronizer in a first direction forces the guide pins on both sides of the locking pin assembly 30 to be guided outwards to force the retention pins (e.g. the first retention pin 42 and the second retention pin 44) outwards to lock the locking pin assembly 30 in a locked position. The crossing over of the guide grooves in response to rotation of the synchronizer in a second direction forces the guide pins on both sides of the locking pin assembly 30 to be guided inwards to force the retention pins (e.g. the first retention pin 42 and the second retention pin 44) inwards to place the locking pin assembly 30 in an unlocked position.

Responsive to rotation of the synchronizer 46 in a first direction about the first axis 32, e.g. from the unlocked position towards the locked position, the guide grooves of the shaft 40 and the synchronizer 46 cross over each other, forcing the guide pins on both sides to be guided outwards to force the retention pins outwards, locking the line replaceable unit. Therefore, the first guide pin 48 rides along a groove wall of at least one of the first shaft groove 64 and the first synchronizer groove 114, such that a first retention pin first end 90 moves towards and/or into the first sidewall 20 of the structural support member 12. The second guide pin 50 also rides along or relative to a groove wall of at least one of the second shaft groove 66 and the second synchronizer groove 116, such that the second retention pin first end 100 moves towards and/or into the second sidewall 22 of the structural support member 12.

Responsive to rotation of the synchronizer 46 in a second direction, which is disposed opposite the first direction, about the first axis 32, e.g. from the locked position towards the unlocked position, the guide grooves of the shaft 40 and the synchronizer 46 cross over each other, pulling the guide pins on both sides inwards to draw the retention pins inwards, unlocking the line replaceable unit 14. The first guide pin 48 rides along or relative to a groove wall of at least one of the first shaft groove 64 and the first synchronizer groove 114, such that a first retention pin first end 90 moves away from the first sidewall 20 of the structural support member 12, towards the first synchronizer end 110. The second guide pin 50 also rides along a groove wall of at least one of the second shaft groove 66 and the second synchronizer groove 116, such that the second retention pin first end 100 moves away from the second sidewall 22 of the structural support member 12, towards the second synchronizer end 112.

The locking pin assembly 30 is arranged as a synchronous locking pin assembly that synchronously moves the first retention pin 42 and the second retention pin 44 along the first axis 32 relative to walls of the structural support members 12. In some embodiments, indicators may be disposed on the exterior surface of the synchronizer 46 to provide an indication of the locked position and the unlocked position of the locking pin assembly 30.

The synchronous locking pin assembly 30 enables an operator to rotate and tighten the fastener 150 to lock and unlock the locking pin assembly 30. This reduces installation and removal time of the line replaceable unit 14. The synchronous locking pin assembly also enables single hand procedures to be performed instead of two-handed procedures. The synchronous locking pin assembly also is less prone to errors, as incorrect extension in locking of retention pins is inhibited.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A cargo loading system, comprising:
   a structural support member having a first sidewall, a second sidewall disposed opposite the first sidewall, and a floor extending between the first sidewall and the second sidewall; and
   a locking pin assembly arranged to secure a line replaceable unit to the structural support member, the locking pin assembly comprising:
      a shaft extending between a first shaft end and a second shaft end along a first axis,
      a first retention pin disposed within the shaft and extending at least partially through the first shaft end,
      a second retention pin disposed within the shaft and extending at least partially through the second shaft end, and
      a synchronizer disposed about and coaxial with the shaft, the synchronizer extending between a first synchronizer end and a second synchronizer end along the first axis, responsive to rotation of the synchronizer about the first axis, the first retention pin moves relative to the first shaft end and the first sidewall along the first axis.

2. The cargo loading system of claim 1, wherein the shaft defines a first shaft groove and a second shaft groove that is spaced apart from the first shaft groove.

3. The cargo loading system of claim 2, the synchronizer defines a first synchronizer groove partially aligned with the first shaft groove and a second synchronizer groove partially aligned with the second shaft groove.

4. The cargo loading system of claim 3, wherein the locking pin assembly further comprising: a first guide pin extends through the first shaft groove, the first synchronizer groove, and into the first retention pin.

5. The cargo loading system of claim 4, wherein in response to rotation of the synchronizer in a first direction about the first axis, the first guide pin rides along at least one of the first shaft groove and the first synchronizer groove, such that an end of the first guide pin moves towards the first sidewall of the structural support member.

6. The cargo loading system of claim 5, wherein in response to rotation of the synchronizer in a second direction about the first axis, the first guide pin rides along at least one of the first shaft groove and the first synchronizer groove, such that the end of the first guide pin moves away from the first sidewall of the structural support member.

7. The cargo loading system of claim 3, wherein the locking pin assembly further comprising: a second guide pin extends through the second shaft groove, the second synchronizer groove, and into the second retention pin.

8. The cargo loading system of claim 7, wherein in response to rotation of the synchronizer in a first direction about the first axis, the second guide pin rides along at least one of the second shaft groove and the second synchronizer groove, such that an end of the second guide pin moves towards the second sidewall of the structural support member.

9. The cargo loading system of claim 8, wherein in response to rotation of the synchronizer in a second direction about the first axis, the second guide pin rides along at least one of the second shaft groove and the second synchronizer groove, such that the end of the second guide pin moves away from the second sidewall of the structural support member.

10. The cargo loading system of claim 1, wherein the shaft defines a flat that is disposed proximate the first shaft end.

11. The cargo loading system of claim 10, wherein the first sidewall of the structural support member includes an anti-rotation feature that extends towards and engages the flat to inhibit rotation of the shaft about the first axis.

12. A locking pin assembly for a cargo loading system, comprising:
    a shaft extending between a first shaft end and a second shaft end along a first axis, the shaft defines a first shaft groove disposed proximate the first shaft end and a second shaft groove disposed proximate the second shaft end;
    a first retention pin disposed within the shaft;
    a second retention pin disposed within the shaft; and
    a synchronizer disposed about and coaxial with the shaft, the synchronizer being rotatable about the shaft and extending between a first synchronizer end and a second synchronizer end along the first axis, the synchronizer defines a first synchronizer groove that crosses over the first shaft groove and a second synchronizer groove that crosses over the second shaft groove.

13. The locking pin assembly of claim 12, wherein the shaft defines a shaft opening that extends along a second axis that is disposed transverse to the first axis.

14. The locking pin assembly of claim 13, wherein the synchronizer defines a synchronizer opening.

15. The locking pin assembly of claim 14, wherein the synchronizer is rotatable about the first axis between a first position and a second position.

16. The locking pin assembly of claim 15, wherein while the synchronizer is in the first position the shaft opening is proximately aligned with the synchronizer opening along the second axis.

17. The locking pin assembly of claim 15, wherein while the synchronizer is in the second position, the shaft opening is offset from the synchronizer opening.

18. The locking pin assembly of claim 15, wherein responsive to rotation of the synchronizer between the first position and the second position, at least one of the first retention pin moves relative to the first shaft end and the second retention pin moves relative to the second shaft end.

19. The locking pin assembly of claim 12, further comprising: a first guide pin extends through the first shaft groove, the first synchronizer groove, and into the first retention pin.

20. The locking pin assembly of claim 12, further comprising: a second guide pin extends through the second shaft groove, the second synchronizer groove, and into the second retention pin.

\* \* \* \* \*